United States Patent [19]

Yoneda et al.

[11] Patent Number: 4,810,945
[45] Date of Patent: Mar. 7, 1989

[54] NUMERICAL CONTROL FEED DEVICE FOR MACHINE TOOL

[75] Inventors: Takao Yoneda, Nagoya; Haruo Ohmura, Aichi, both of Japan

[73] Assignee: Toyoda Koki Kabushiki Kaisha, Kariya, Japan

[21] Appl. No.: 171,222

[22] Filed: Mar. 22, 1988

Related U.S. Application Data

[63] Continuation of Ser. No. 118,029, Nov. 5, 1987, abandoned.

[30] Foreign Application Priority Data

Nov. 7, 1986 [JP] Japan .................. 61-265908

[51] Int. Cl.[4] .................................. G05B 19/25
[52] U.S. Cl. ............................ 318/571; 318/632; 318/561; 318/616; 364/474.3; 51/165.71
[58] Field of Search ........... 318/632, 571, 616, 561, 318/681, 677; 364/474, 475; 51/165.71

[56] References Cited

U.S. PATENT DOCUMENTS

| | | | |
|---|---|---|---|
| 3,344,559 | 11/1961 | Inaba et al. | 51/105 |
| 3,482,357 | 12/1969 | Inaba et al. | 51/105 |
| 3,798,430 | 3/1974 | Simon et al. | 318/573 X |
| 3,917,930 | 11/1975 | Davey et al. | 318/632 X |
| 4,041,287 | 8/1977 | Kolell et al. | 318/569 |
| 4,061,952 | 12/1977 | Dinsdale et al. | 318/572 |
| 4,099,113 | 7/1978 | Hayashi | 318/632 |
| 4,206,393 | 3/1978 | Chiba | 318/632 |
| 4,250,551 | 2/1981 | Paveglio et al. | 318/569 |
| 4,266,375 | 5/1981 | Nishimura et al. | 318/571 X |
| 4,341,986 | 7/1982 | Browder | 318/618 |
| 4,356,552 | 10/1982 | Imazeki et al. | 318/571 X |
| 4,371,941 | 2/1983 | Gordiski et al. | 318/571 X |
| 4,441,281 | 4/1984 | Gordiski | 318/571 X |
| 4,498,036 | 2/1985 | Salemka | 318/561 |
| 4,533,991 | 8/1985 | Georgis | 318/561 X |
| 4,553,078 | 11/1985 | Wise | 318/592 |
| 4,653,360 | 3/1987 | Compton | 318/571 X |

FOREIGN PATENT DOCUMENTS

59-194206 11/1984 Japan .

*Primary Examiner*—Benjamin Dobeck
*Attorney, Agent, or Firm*—Oblon, Fisher, Spivak, McCelland & Maier

[57] ABSTRACT

In a numerical control feed device, an objective velocity signal is produced from the difference between command pulses from a numerical controller, which indicative of an objective feed amount and an objective feed rate for a slide of a machine tool, and a feedback feed amount from a pulse generator driven by a servomotor. A subtraction circuit calculates a difference signal based on the objective velocity signal and a feedback velocity signal from a tachogenerator also driven by the servomotor and applies the difference signal to a drive amplifier for driving the servomotor. A frequency-voltage converter generates a feedforward velocity signal depending on the frequency of the command pulses. A gain adjustable amplifier amplifies the feedforward velocity signal at the amplifying ratio designated by the numerical controller and outputs the amplified feedforward velocity signal to the subtraction circuit for addition. The numerical controller determines the amplifying ratio based on various parameters such as the mechanical characteristic of the machine tool, the shape of a workpiece to be machined, an objective feed rate used in an instantaneous machining operation, and so forth.

6 Claims, 8 Drawing Sheets

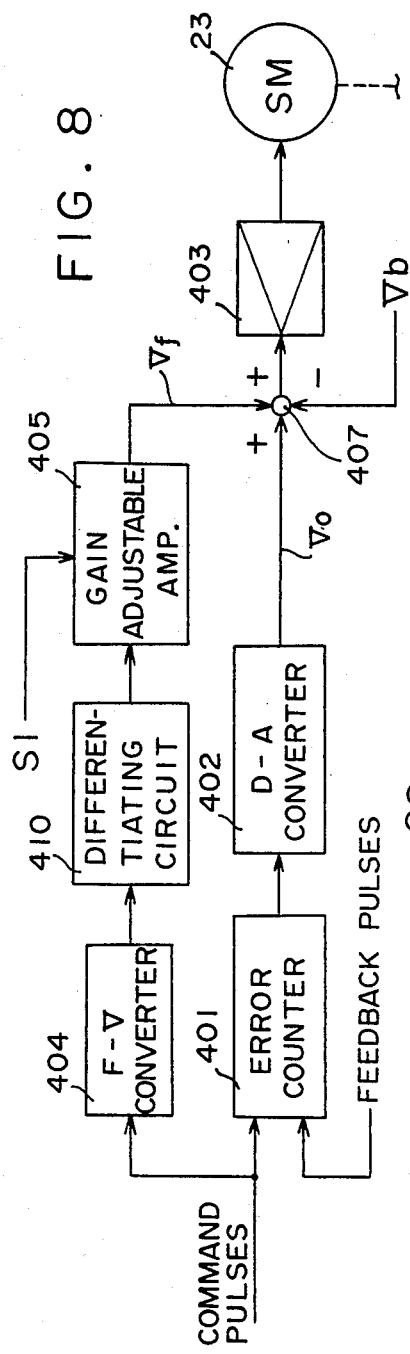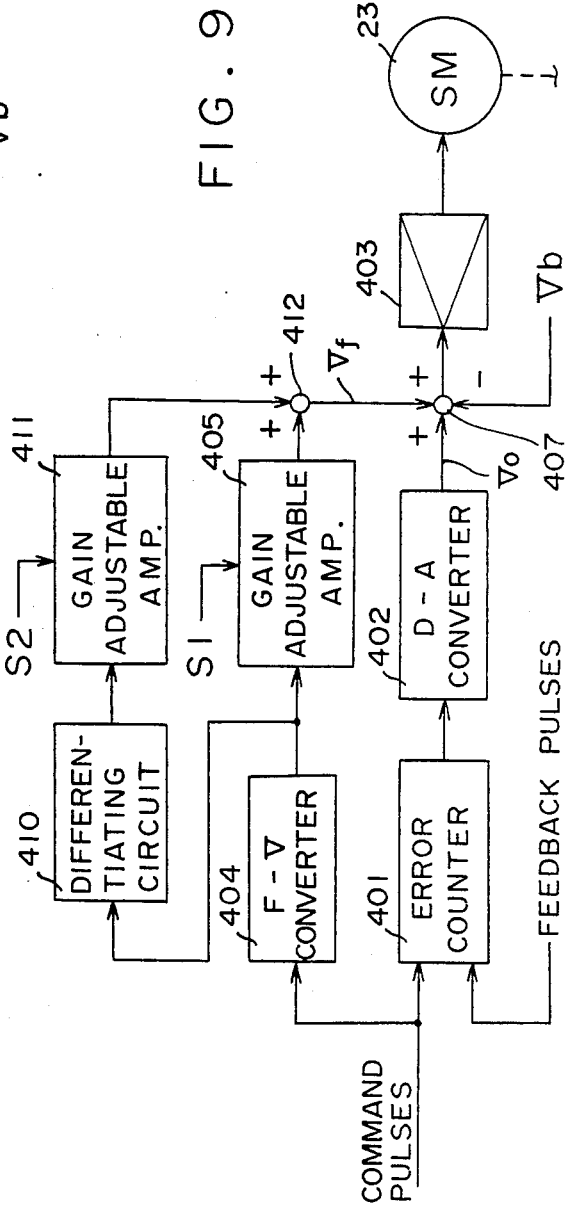

NUMERICAL CONTROL FEED DEVICE FOR MACHINE TOOL

This application is a continuation of application Ser. No. 118,029, filed on Nov. 5, 1987, now abandoned.

BACKGROUND OF THE INVENTION

1. Field of the Invention

The present invention relates to a numerical control feed device for use in a machine tool, preferably, of the type that machines workpieces of an oval or elliptical cross section such as automotive camshafts.

2. Discussion of the Prior Art

A method has been known heretofore wherein feed movement of a grinding wheel in a direction perpendicular to the axis of a work spindle is controlled by a numerical controller in synchronous relation with rotation of the work spindle to grind a workpiece such as automotive camshaft or the like. In this method, profile data have to be supplied to the numerical controller in order to effect the synchronous control of feed movement of the grinding wheel. The profile data prescribe the feed movement of the grinding wheel per unit angle rotation of the work spindle so that the grinding wheel performs profile generating motion involving reciprocative movement following a desired finish shape of the workpiece.

Further, in order to grind the workpiece, machining cycle data which control feed, cut-in feed, retraction movement and so forth of the grinding wheel have to be prepared in addition to the profile data. The workpiece is machined when rotation of the work spindle and feed movement of the grinding wheel are numerically controlled in accordance with the machining cycle data and the profile data. In particular, the machining accuracy of the workpiece depends largely upon the ability of a work spindle axis and a grinding wheel feed axis to accurately follow command data or signals. Thus, increasing the gains of servo amplifiers in the feed servo systems may be conceived to reduce errors due to following delays. However, this solution cannot be taken because of causing instability in servo control.

SUMMARY OF THE INVENTION

Accordingly, it is a primary object of the present invention to provide an improved numerical control feed device which can minimize machining errors due to following delays.

Another object of the present invention is to provide an improved numerical control feed device capable of varying its responsivity to command signals, in dependence upon various parameters such as mechanical characteristic of a machine tool in which the device is used, the shape of a workpiece to be machined, feed rate and the like.

Briefly, a numerical control feed device according to the present invention includes a servomotor driven by a drive amplifier for moving a slide with a tool or workpiece, a first detector for detecting an actual feed amount of the slide, a second detector for detecting an actual feed rate so as to output a feedback velocity signal, feed command means for generating feed command signals in accordance with numerical control data, said feed command signals representing an objective feed amount and an objective feed rate of the slide, error signal generating means for generating an objective velocity signal corresponding to the difference between said feed command signals and said actual feed amount from said first detector, a feedforward velocity signal generator responsive to the feed command signals for generating a feedforward velocity signal corresponding thereto, a gain adjustable amplifier for amplifying the feedforward velocity signal at an amplifying ratio designated thereto, a subtraction circuit for outputting to said drive amplifier a drive signal corresponding to the difference between the objective and feedback velocity signals and the amplified feedforward velocity signal, and amplifying gain control means for calculating an amplifying ratio based on various predetermined parameters, so as to input the amplifying ratio to the gain adjustable amplifier.

With this configuration, since the amplifying ratio of the gain adjustable amplifier can be varied as designated from the amplifying gain control means, the responsivity of the feed device to the feed command signals can be adjusted depending on the various predetermined parameters constituting the machining condition. Consequently, machining errors due to following delays can be minimized notwithstanding that the stability in control of the system can be reliably assured.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of the preferred embodiments, wherein like reference numerals designate identical or corresponding parts throughout the several views, and in which:

FIG. 8 is a block diagram of a part of the numerical control feed device constituting another embodiment; and FIG. 9 is a block diagram of a part of the numerical control feed device constituting a still another embodiment.

DETAILED DESCRIPTION OF THE PREFERRED EMBODIMENTS

Figure 1:
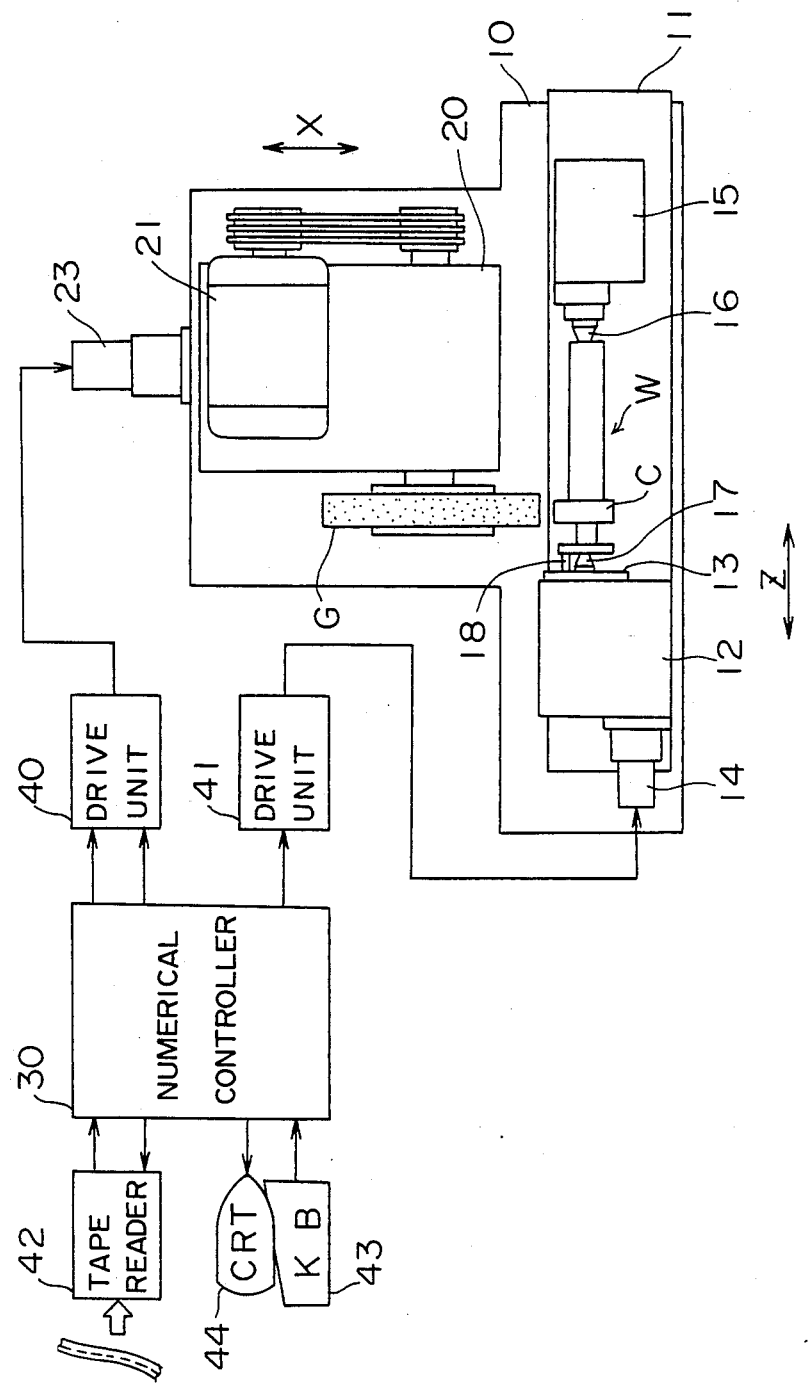
FIG. 1 is a schematic plan view of a numerical control cam grinding machine incorporating numerical control feed devices according to the present invention.

In the illustrated embodiments, a numerical control feed device according to the present invention is incorporated in a numerical control cam grinding machine. Referring now to the drawings and particularly, to FIG. 1 thereof, the numerical control cam grinding machine is shown comprising a bed 10, on which a table 11 is slidably guided along a Z-axis which is parallel to the axis of a work spindle 13. A workhead 12 is mounted on the left-hand end of the table 11. The workhead 12 has rotatably carried therein the work spindle 13, which is connected to a servomotor 14 so as to be rotated thereby. A tail stock 15 is also mounted on the right-hand end of the table 11. A workpiece W having a cam C is carried between a center 17 of the work spindle 13 and a center 16 of the tail stock 15. The left end of the workpiece W is engaged with a positioning pin 18, which is fixed on the work spindle 13, so as to synchronize the phase of the workpiece W with the phase of the work spindle 13.

A tool slide 20 is slidably guided on a rear portion of the bed 10 for movement toward and away from the workpiece W along an X-axis. A grinding wheel G rotated by a motor 21 is mounted on the tool slide 20. The tool slide 20 is connected to a servomotor 23 through a feed screw (not shown) so that advancing and retraction movement of the tool slide 20 is effected by the servomotor 23.

Figure 2:
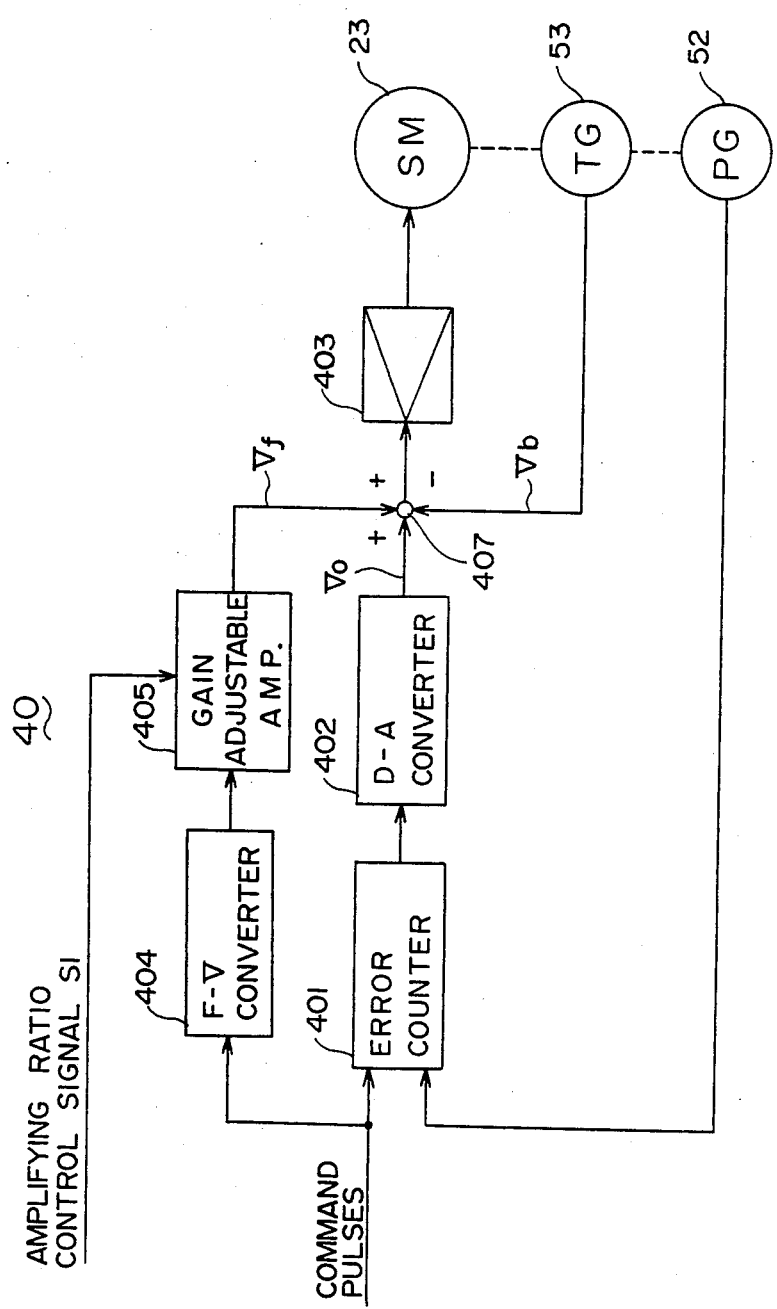
FIG. 2 is a block diagram showing one of the numerical control feed devices.

Drive units 40, 41 are circuits for driving the servomotors 23 and 14, respectively, in response to feed command signals or pulses, which are generated by a numerical controller 30. As shown in FIG. 2 in detail, the drive unit 40 includes an error counter 401, which counts command pulses from the numerical controller 30 and feedback pulses from a pulse generator 52 differentially. As is well-known in the art, the number of the command pulses represents an objective feed amount through which the tool slide 20 is to be moved, while the frequency of the command pulses represents an objective feed rate or velocity at which the slide 20 is to be moved. The pulse generator 52 driven by the servomotor 23 detects the actual feed amount of the tool slide 20. Digital error data from the error counter 401 are converted by a digital-analoque (D-A) converter 402 to an analogue error signal (i.e., objective velocity signal) Vo corresponding thereto. The error signal Vo of the D-A converter 402 is led to a subtraction circuit 407, which subtracts a feedback velocity signal Vb from the error signal Vo. The feedback velocity signal Vb is generated by a tachogenerator 53 which is driven by the servomotor 23 to detect the actual feed rate of the tool slide 20. An output signal of the subtraction circuit 407 is led to a drive amplifier 403, which drives the servomotor 23.

The drive unit 40 further includes a frequency-voltage (F-V) converter 404 which converts the frequency of the command pulses into a voltage signal corresponding thereto, and a gain adjustable amplifier 405 which amplifies the voltage signal at an amplifying ratio according to an amplifying ratio control signal S1 input from the numerical controller 30, so as to output the amplified signal Vf to the subtraction circuit 407 for addition therein. The F-V converter 404 and the gain adjustable amplifier 405 constitute a feedforward control circuit and operate to add to the subtraction circuit 407 an amplified feedforward velocity signal Vf which is proportional to the velocity component of cam profile data as referred to later. Accordingly, following delay which occurs in connection with such velocity component is compensated for. The drive unit 41 has the same circuit configuration as that of the drive unit 40.

Figure 3:
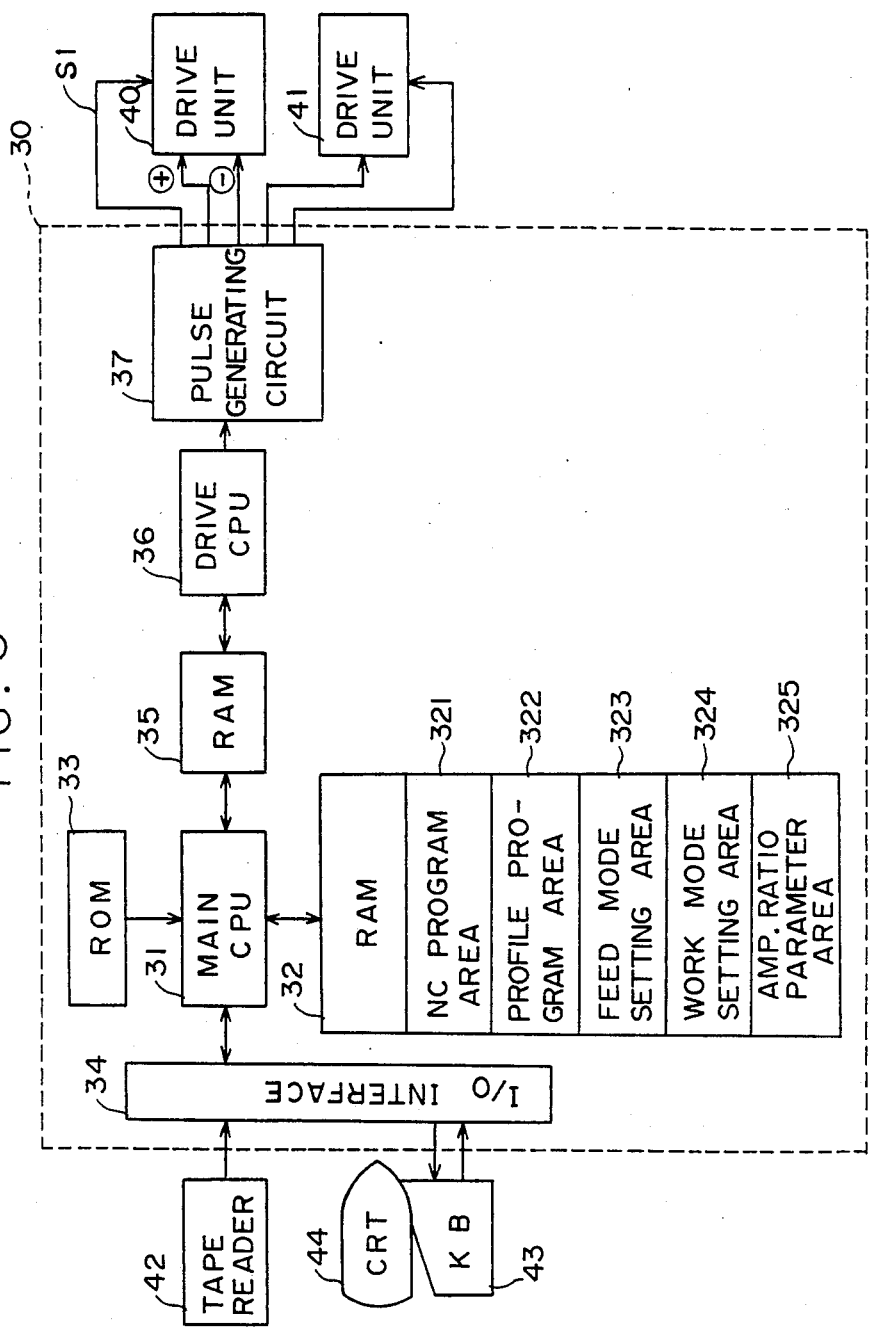
FIG. 3 is a block diagram of a numerical controller for the grinding machine.

As shown in FIG. 3, the numerical controller 30 is composed primarily of a main CPU 31 for numerical control data processings, a read-only memory (ROM) 33 for storing system control programs, a random access memory (RAM) 32 for storing a numerical control (NC) program, cam profile programs, various parameters and the like, and an input/output interface 34. In the RAM 32, there are provided an NC program area 321 for storing the NC program, a profile program area 322 for storing the cam profile programs each of which is composed of numerous blocks of profile data calculated based on the ideal final shape of a camshaft, a feed mode setting area 323 for storing set feed modes, a work mode setting area 324, and an amplifying ratio parameter area 325 for storing various parameters to determine the aforementioned amplifying ratio. The numerical controller 30 is further provided with a drive CPU 36, another RAM 35 and a pulse distribution circuit 37 which constitute a drive system for the servomotors 14 and 23. The RAM 35 is a storage device for receiving positioning and velocity data for the tool slide 20 and the work spindle 13 from the main CPU 31. The drive CPU 36 is a device which performs the calculations for slow-up, slow-down, interpolation to objective points and the like with regard to the feed movements of the tool slide 20 so as to output positioning data of interpolated points approximately periodically. The pulse distribution circuit 37 is a circuit for outputting feed command pulses when receiving feed and rotational amount commands and feed and rotational speed commands from the drive CPU 36.

Figure 4:
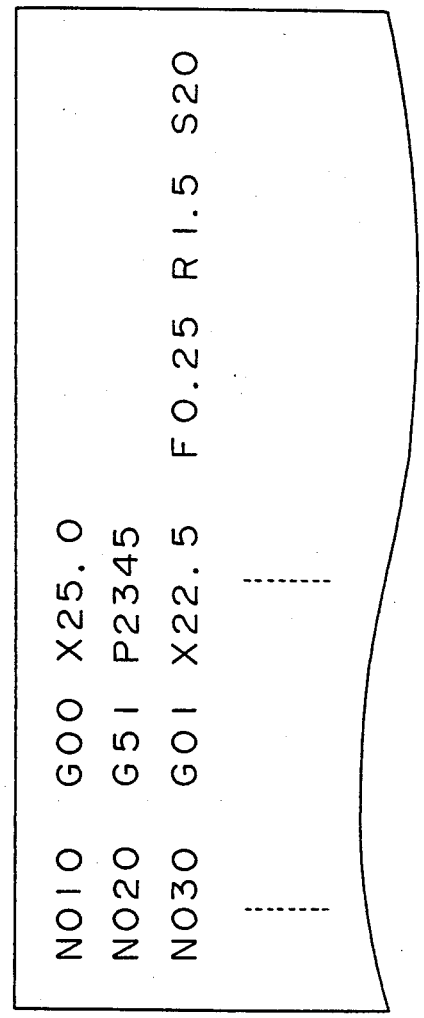
FIG. 4 is an explanatory view showing an example of a numerical control program supplied to the numerical controller.
Figure 5:
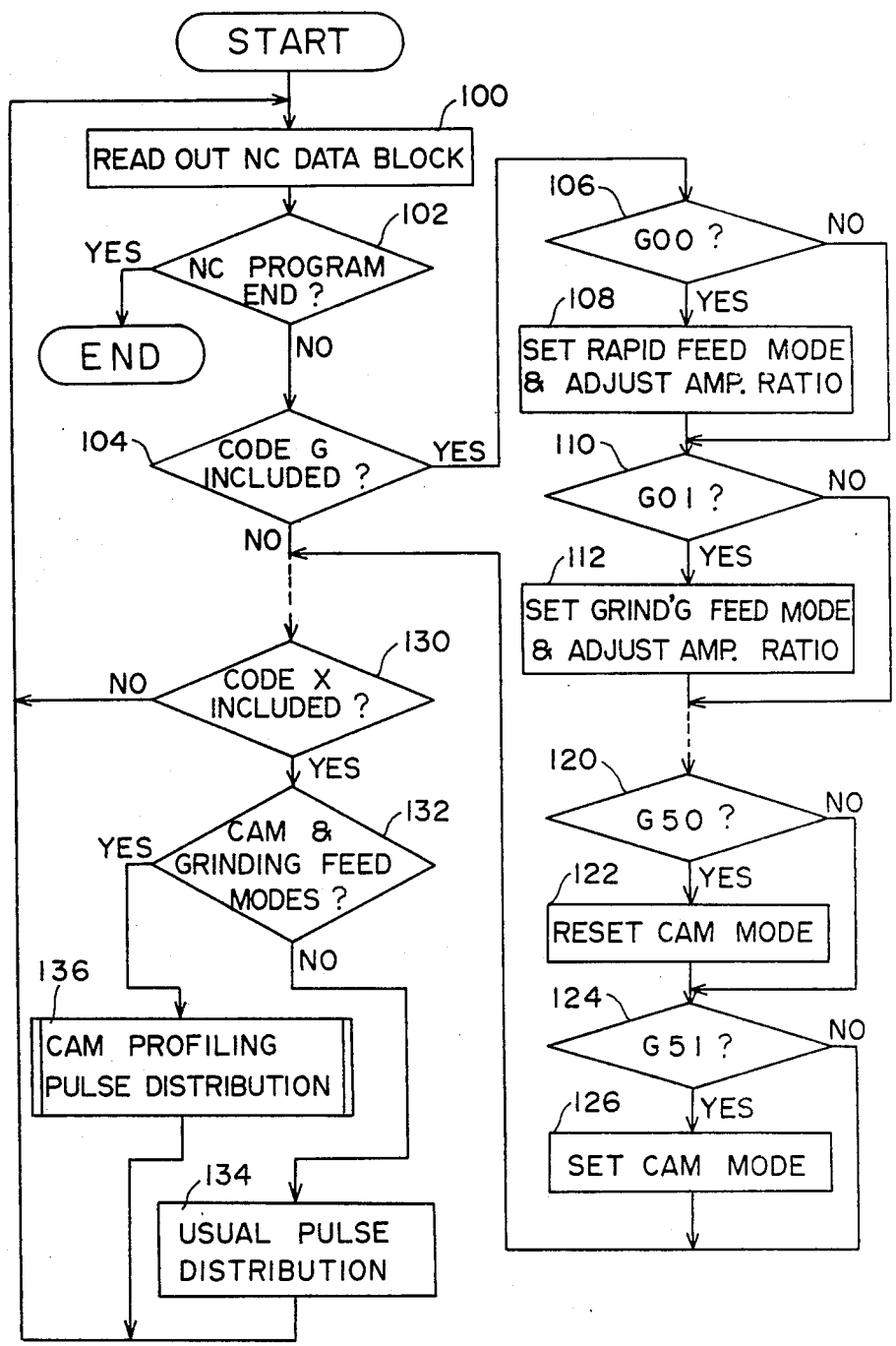
FIG. 5 is a flow chart of a system control program executed by the numerical controller for controlling the machine tool in accordance with the numerical control program.

Operation of the apparatus as constructed above will be described hereinafter. An NC program including data to define a machining cycle has been stored in the NC data area 321 in advance. It is prepared as shown in FIG. 4. The NC program is decoded by the main CPU 31 in accordance with the proceedings shown by a flow chart in FIG. 5. More specifically, one data block of the NC program is read out in step 100 and is ascertained in step 102 as to whether or not it commands the end of the program. With the program end command being read out, the numerical control according to the NC program is terminated. If the read-out block does not represent the program end, step 104 and those successive thereto follow to discriminate any command code of the read-out block. If the read-out block is ascertained to include code G, the processing of the CPU 31 is moved to step 106 for further specific ascertainment of the read-out code G. That is, in steps 106 through 126, a mode according to code G is set, and the amplifying ratio of the gain adjustable amplifier 405 is adjusted in the case of code G00 or G01. If the read-out code G is ascertained to be G00 in step 106, step 108 is executed wherein a flag in the feed mode setting area 323 is set to designate RAPID FEED mode as the feed mode. Similarly, if code G01 is identified in step 110, another flag in the feed mode setting area 323 is alternateively set in step 112 to designate GRINDING FEED mode as the feed mode. Further, if code G50 is identified in step 120, a flag in the work mode setting area 324 is reset in step 122 to designate USUAL mode as the work mode. Similarly, when code G51 is identified in step 124, the flag in the work mode setting area 324 is set in step 126 to designate CAM mode as the work mode.

In each of the steps 108 and 112, adjustment of the amplifying ratio is performed in addition to the aforementioned mode setting. As a feed rate (code F) and a work spindle rotational speed (code S) are designated by a read-out NC data block such as block N030 of the NC program shown in FIG. 4, they are stored in the amplifying ratio parameter area 325 of the RAM 32.

Other parameters such as a machine constant M, a workpiece shape constant P and the like have been stored in the parameter area 325 in advance. The machine constant M is determined depending on the mechanical characteristic of the grinding machine such as typically the machine rigidity, while the workpiece shape constant P is determined depending on the shape of the workpiece W. The workpiece shape constant P is determined to become larger as the maximum value in the velocity component and/or the acceleration component of the profile data is larger.

Figure 6:
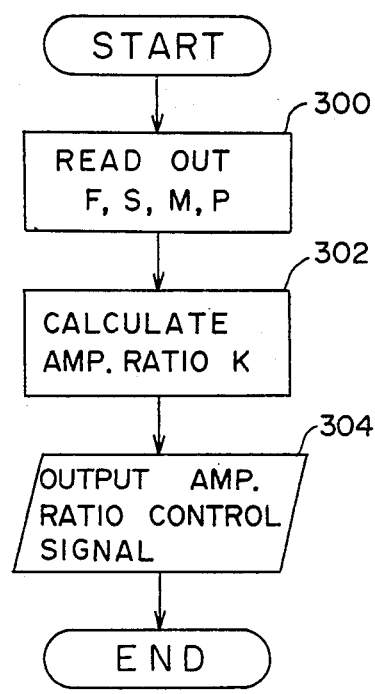
FIG. 6 is a flow chart of a routine executed by the numerical controller for determining and outputting an amplifying ratio.

Adjustment of the amplifying ratio in each of the steps 108 and 112 is performed in accordance with a flow chart shown in FIG. 6. That is, step 300 is executed to read out a feed rate F, a work spindle rotation speed S, the machine constant M and the workpiece shape constant P from the parameter area 325. An amplifying ratio K that is optimum to the instantaneous machining is calculated in step 302, using an approximating equation of the first order as noted below.

$$K = a1 \cdot F + a2 \cdot S + a3 \cdot M + a4 \cdot P$$

Subsequently, an amplifying ratio control signal S1 which is determined depending on the calculated value K is output to the gain adjustable amplifier 405 in step 304, whereby the amplifying ratio of the gain adjustable amplifier 405 accords with the calculated value K. It is to be noted that respective optimum values of these coefficients a1, a2, a3 and a4 in the above equation can be obtained experimentally.

After the amplifying ratio adjustment, the processing of the main CPU 31 is moved to step 130 through the aforementioned steps 120 through 126. If it is ascertained in step 130 that the NC data block read out in step 100 includes code X, it is then ascertained in step 132 whether or not CAM mode and GRINDING FEED mode have been set. With CAM and GRINDING FEED modes having been set, a pulse distribution operation for cam profile generation is performed in step 136. With CAM and GRINDING FEED modes having not been set, a usual pulse distribution operation wherein no synchronization is made with the work spindle rotation is performed in step 134.

Taking as one example the NC program shown in FIG. 4, the grinding wheel G is advanced at a rapid feed rate designated by code G00 and is positioned to an absolute position designated by data X25.0 in accordance with data block N010. In accordance with the next data block N020, the work mode is set to CAM mode designated by code G51 and a cam profile program designated by data P2345 is selected. Further, in accordance with data block N030, the feed mode is set to GRINDING FEED mode designated by code G01 and a cam grinding processing up to an absolute position defined by data X22.5 is performed. Code data F of data block N030 represents a feed amount of the grinding wheel G within one revolution of the work spindle 13, and code R of the same data block represents a feed rate at which the grinding wheel G is to be moved within one rotation of the work spindle 13. Accordingly, where the feed amount and feed rate are designated as F0.25 and R1.5 respectively, the grinding wheel G is moved at a feed rate of 1.5 mm feed per work spindle rotation and grinds the workpiece W to the depth of 0.25 mm per work spindle rotation. Since the total grinding allowance is 2.5 mm in depth and the grinding allowance per one work spindle rotation is 0.25 mm in depth, the work spindle 13 is rotated 10 times to finish the workpiece W. From the relation between the feed rate and the feed amount, it will be realized that the cut-in feed of the grinding wheel G per work spindle rotation is given when the work spindle 13 rotates a predetermined angle (referred to later as "cut-in angle") which is extremely smaller than 360 degrees.

Figure 7:
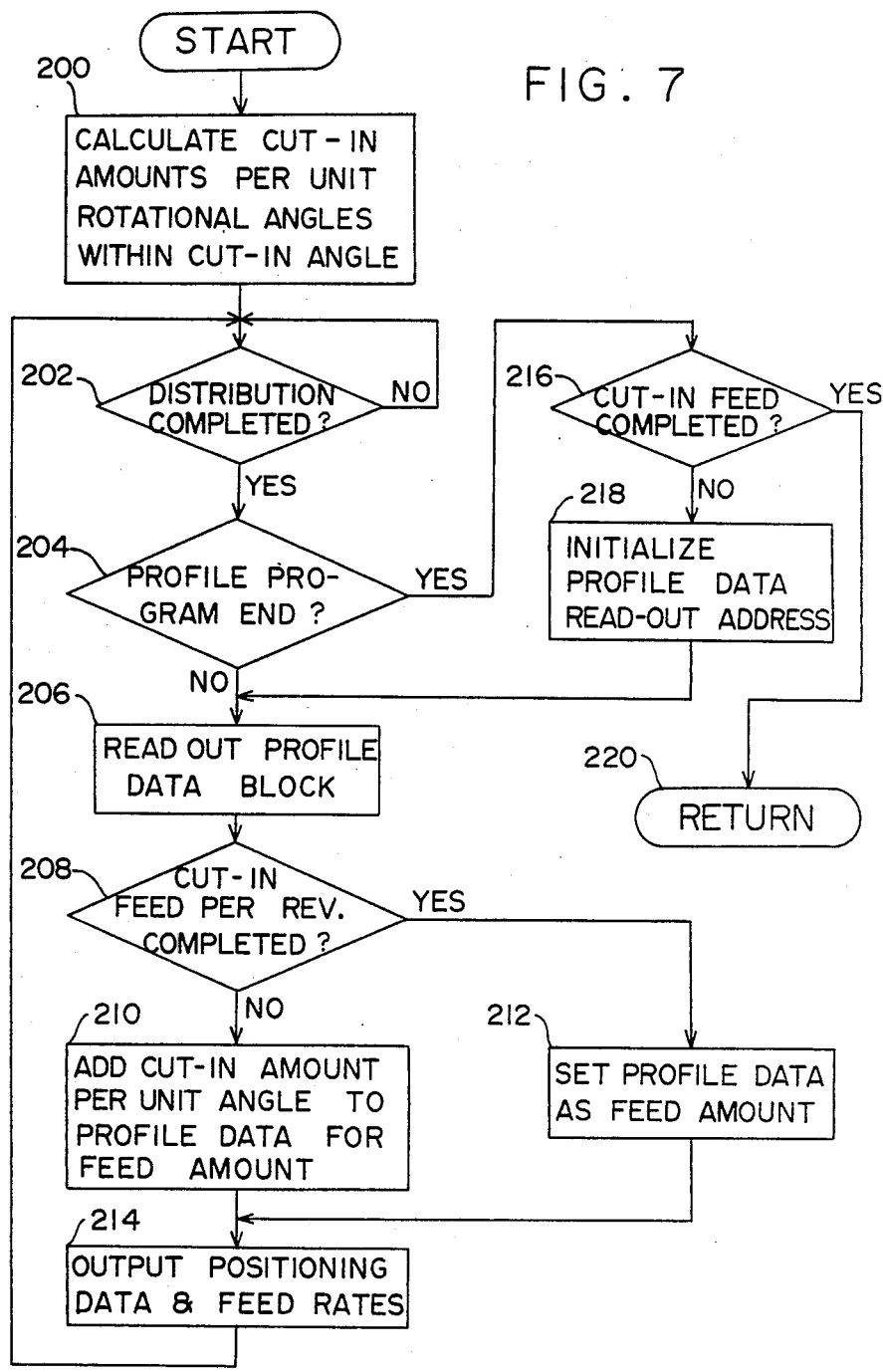
FIG. 7 is a flow chart of another routine executed by the numerical controller for performing a pulse distribution operation to effect cam profiling motion.

The processings for cam profile generation are executed in accordance with a flow chart shown in FIG. 7. The designated profile program in the area 322 of the RAM 32 defines by the number of pulses a feed amount which the grinding wheel G is to move forwardly or backwardly each time the work spindle 13 rotates a unit angle of 0.5 degrees. First, all of the pulse numbers which respectively correspond to cut-in feed amounts per respective unit rotational angles (0.5°) within the cut-in angle is calculated depending upon the data with code R in step 200. Then, by repeatedly executing step 202 and those successive thereto, positioning data (i.e., pulse numbers) and distribution frequencies for the tool slide 20 and the work spindle 13 are output to the drive CPU 36 via the RAM 35 at predetermined intervals. The main CPU 31 outputs the next positioning and frequency data each time it receives a pulse distribution completion signal from the drive CPU 36.

The positioning data are generated and output as follows: If the completion of a pulse distribution is ascertained in step 202, step 204 follows to ascertain whether or not the end of the profile program has been reached. If no end of the profile program has been reached, a successive profile data block which represents a pulse number per unit angle rotation is read out in step 206, and it is then ascertained in step 208 whether or not the cut-in feed within one revolution of the work spindle 13 has been completed. This is ascertained by reference to code data F. In this case, it is ascertained whether or not the cut-in feed amount within one revolution has reached 0.25 mm. If the cut-in feed within one revolution is not completed, an objective feed amount within the next unit angle rotation is calculated by adding a cut-in feed amount within the next unit angle rotation to the read-out profile data (i.e., pulse number) in step 210. On the other hand, if the cut-in feed within one revolution is finished, the objective feed amount is set as only the read-out profile data in step 212. Then, the objective feed amount (i.e., pulse number) and a distribution frequency for the tool slide 20 per unit angle rotation of the the work spindle 13 are output to the drive CPU 36 through the RAM 35 in step 214. At the same time, a constant pulse number covering the next unit angle rotation and a constant distribution frequency for the work spindle 13 are output to the drive CPU 36 through the RAM 35.

For example, where the rotational speed of the work spindle 13 is designated as 20 r.p.m., the distribution frequency for the work spindle 13 is determined to distribute 50 pulses within 4 milliseconds for 0.5 degree rotation, while that for the tool slide 20 is determined to distribute pulses of the number covering the objective feed amount within the same 4 milliseconds.

Afterward, the processing of the main CPU 31 is returned to step 202. If it is ascertained that the data previously read is the last of the profile data in step 204, it is ascertained in step 216 whether or not the total cut-in feed amount reaches a programmed amount, i.e., 2.5 mm in this particular instance. If the total cut-in feed amount does not reach the programmed amount, the processing is moved to step 206 via step 218 so as to continue the above-mentioned processings repeatedly. In step 218, the read-out address for profile data is set to the start block of the profile data blocks for the next rotational cycle. If the total cut-in feed amount reaches the programmed amount, the processing for cam grinding according to the NC data block N030 is finished.

During the aforementioned grinding operation, the feedforward velocity signal Vf proportional to the objective feed rate is input to the subtraction circuit 407 for addition, and the gain adjustable amplifier 405 is operated in response to the control signal S1 from the main CPU 31 to adjust the amplifying ratio of the gain adjustable amplifier 405. Consequently, the responsivity of the feed system can be improved. The ratio of the feedforward velocity signal Vf to the objective velocity signal Vo can be adjusted to a value appropriate to the condition under which a machining operation is performed.

Although the feedforward velocity signal Vf is proportional to the objective feed rate in the illustrated embodiment, it may otherwise be proportional only to the acceleration of the objective feed rate or to the both of the objective feed rate and the acceleration thereof, as illustrated in FIGS. 8 and 9. More specifically, in a second embodiment shown in FIG. 8, a differentiating circuit 410 is interposed between the F-V converter 404 and the gain adjustable amplifier 405. Therefore, the feedforward velocity signal Vf to the subtraction circuit 407 is proportional to the acceleration component of the objective feed rate. In a third embodiment shown in FIG. 9, a differentiating circuit 410 and another gain adjustable amplifier 411 in series are connected in parallel relation with the gain adjustable amplifier 405, and output signasls from both of the gain adjustable amplifiers 405 and 411 are added by an addition circuit 412 before being input to the subtraction circuit 407. The amplifier 411 receives another amplifying ratio control signal S2, which is determined by the main CPU 31 in a manner similar to such determination of the control signal S1. Thus, in the third embodiment, compensation can be made for following delay which are caused by the objective feed rate and the acceleration thereof.

Obviously, numerous modifications and variations of the present invention are possible in light of the above teachings. It is therefore to be understood that within the scope of the appended claims, the present invention may be practiced otherwise than as specifically described herein.

What is claimed is:

1. A numerical control feed device for moving a slide with one of a tool and a workpiece to a position designated by numerical control data in a machine tool, said feed device comprising:

a servomotor for moving said slide;

a drive amplifier for driving said servomotor;

a first detector for detecting the actual feed amount of said slide;

a second detector for detecting the actual feed rate of said slide so as to generate a feedback velocity signal;

feed command means for generating feed command signals in accordance with said numerical control data, said feed command signals representing an objective feed amount to which said slide is to be moved and an objective feed rate at which said slide is to be moved;

error signal generating means responsive to said feed command signals given from said feed command means and the actual feed amount detected by said first detector, for generating an objective velocity signal corresponding to the difference between said feed command signals and said actual feed amount;

a feedforward velocity signal generator responsive to said feed command signals for generating a feedforward velocity signal corresponding to said objective feed rate;

a gain adjustable amplifier for amplifying said feedforward velocity signal from said feedforward velocity signal generator at an amplifying ratio designated thereto so as to output an amplified feedforward velocity signal;

a subtraction circuit for generating a difference signal based on said objective velocity signal, said feedback velocity signal and said amplified feedforward velocity signal, so as to output said difference signal to said drive amplifier; and amplifying ratio command means for generating said amplifying ratio based on various parameters so as to output said amplifying ratio to said gain adjustable amplifier.

2. A numerical control feed device as set forth in claim 1, wherein said feed command signals generated by said feed command means comprises command pulses the number and frequency of which respectively correspond to said objective feed amount and said objective feed rate.

3. A numerical control feed device as set forth in claim 2, wherein said feedforward velocity signal generator comprises:

an F-V converter for generating a voltage signal correspnding to the frequency of said command pulses generated from said feed command means.

4. A numerical control feed device as set forth in claim 1, wherein said feed command means and said amplifying ratio command means are constituted by a computerized numerical controller.

5. A numerical control feed device as set forth in claim 4, wherein said computerized numerical controller includes:

means for calculating said amplifying ratio based on said various parameters which are determined by at least the characteristic of said machine tool, the shape of said workpiece and said objective feed rate.

6. A numerical control feed device as set forth in claim 1, further comprising:

a differentiating circuit interposed between said feedforward velocity signal generator and said gain adjustable amplifier for outputting as said feedforward velocity signal the acceleration of said objective feed rate to said gain adjustable amplifier.

* * * * *